April 30, 1963　　　F. K. LEVIN　　　3,087,424
SEISMIC CHARGE DELAY UNIT
Filed Feb. 23, 1960
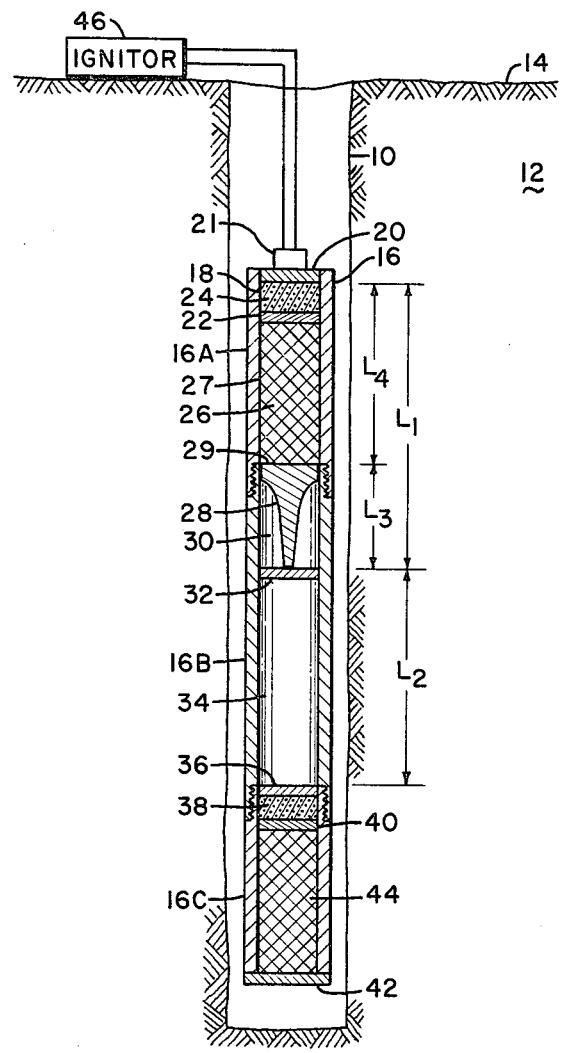
FIG. I
Franklyn K. Levin　Inventor
By John D. Gassett　Attorney

United States Patent Office 3,087,424
Patented Apr. 30, 1963

3,087,424
SEISMIC CHARGE DELAY UNIT
Franklyn K. Levin, Tulsa, Okla., assignor to Jersey Production Research Company, a corporation of Delaware
Filed Feb. 23, 1960, Ser. No. 10,154
7 Claims. (Cl. 102—22)

This invention relates to a method of seismic prospecting. It is particularly directed toward improvements in the generation of seismic waves.

In seismic prospecting, an explosive charge is detonated at a location at or near the surface of the earth at a location referred to as the shot point. The resulting seismic waves travel downwardly through the earth's surface until they encounter discontinuities in the form of interfaces between strata which has the effect of reflecting at least a portion of the energy back toward the surface of the earth. The reflected energy is detected at the surface of the earth by transducers such as geophones which transcribe the mechanical vibration of the transducer caused by the seismic wave into electrical energy. The electrical energy is then recorded.

When explosives are detonated, energy is transmitted in all directions. Secondary reflections then occur when energy which initially travels upwardly from an exploding charge encounters a strong reflected interface above the charge which directs most of the energy downwardly again. The secondary energy which is now reflected downwardly follows along about the same path as the downward basic reflection energy but as it is displaced in time as the geophones receive the impulse from reflections at a later time. These secondary reflections make the recorder or received signal at the surface more complex and therefore more difficult to interpret. Indeed, in some instances, the secondary reflections obscure reflections indicating an event of geological importance.

It is known that the seismic waves travel at one velocity in the earth and at another velocity in the explosive composition making up the charge within the borehole. It has been found that if these two velocities can approach each other the secondary reflections are essentially eliminated. Accordingly, spaced elongated explosive charges have been developed which have a "detonation velocity" closely matching the seismic wave transmission velocity of the earth surrounding the borehole. Various means have been attempted such as having segments of low detonation velocity material placed between and in intimate contact with segments of high detonation velocity material.

The various delay units are normally too expensive for widespread use. Therefore, it is readily seen that there is a need for a simple, inexpensive way to match the time at which the detonation of spaced elongated charges in a shot hole occur to the velocity of the seismic waves traveling in the earth surrounding the borehole. Such a system is disclosed herein.

In accordance with this invention a shock tube delay unit is positioned between two vertically spaced explosive charges. In a preferred embodiment, a shock tube includes, for example, a tubular member divided into two chambers by a membrane. The top chamber is filled with a gas at several atmosphere pressures. The other chamber is preferably partially evacuated. When the membrane is ruptured, a shock wave travels down the tube. The force of this shock wave can be made very great. In accordance with this invention the shock tube delay unit is inserted between two (or more) vertically spaced charges. Means are provided to rupture the membrane between the two chambers upon detonating of the top charge. Upon rupture of the membrane, a shock wave rushes down the shock tube and detonates the lower charge. The shock wave moves down the shock tube at a velocity a few times greater than the velocity of sound in air but at a lower velocity than the velocity of transmission of the seismic waves through the earth. The passage time required of the shock wave to travel through the shock tube is used as a time delay unit.

The invention and its objects may be better understood by reference to the drawing taken in conjunction with the following detailed description in which:

FIG. 1 is a diagrammatic illustration showing an embodiment of this invention in a shot hole.

Referring to the drawing in particular, there is illustrated a seismic shot hole 10 which is drilled into the earth 12 from the surface 14. Shown positioned within the seismic shot hole 10 is a preferred embodiment of this apparatus and the best mode contemplated for carrying out the invention. It includes an elongated housing or tubular member 16, an upper priming chamber 18 formed between plates 20 and 22 in the upper end of tubular member 16. Tubular member 16 may conveniently have an upper section 16A, an intermediate section 16B and a lower section 16C. These sections may be connected by any suitable means such as threaded means as illustrated. A priming composition 24 is placed in chamber 18. An explosive composition chamber 27 is formed within tubular member 16 between plate 22 and cone transformer means 28. An explosive composition 26 is placed in chamber 27. An ignitor 46 is connected to electrical detonator 21 which is used for igniting the top explosive charge.

A high pressure gas chamber 30 is formed within tubular member 16 between cone transformer means 28 and membrane 32. Gas under high pressure may be injected into chamber 30 through well known valve arrangements not shown. A low pressure gas chamber 34 is formed within tubular member 16 below membrane 32 and above plate 36. Low pressure chamber 34 is preferably at least partially evacuated by known methods through suitable valve and pump means not illustrated. A second priming composition 38 is placed in a chamber between plate 36 and plate 40. The lower end of tubular member 16 is enclosed by plate 42. An explosive composition 44 is placed in the chamber between plates 40 and 42. In some instances, plate 36 and priming composition 38 will not be necessary inasmuch as the shock wave will be sufficiently great to detonate the lower charge 44 without the priming composition.

Attention will now be directed more in detail toward the nature of cone transformer means 28 and membrane 32. Cone 28 is preferably used to form the bottom of chamber 27 holding the top explosive composition. The cone may be made from any rigid material such as metal, plastic and the like which is capable of transmitting and concentrating downward wave motion. The amount of force concentrated at the lower end of the cone is conveniently derived by the following equation:

$$\frac{U_2}{U_1}=\frac{D_1}{D_2}$$

in which $U_1$ is the total downward displacement of the wave on the top surface 29 of cone 28, $U_2$ is the concentrated displacement at the small end of the cone, $D_1$ is the diameter of the upper end of the cone and $D_2$ is the diameter of the small end of the cone.

The lower end of the cone 28 rests against membrane 32. Membrane 32 may be made of any material such as copper capable of containing or holding a gas in chamber 30 with a large pressure differential across the membrane itself. Membrane 32 must further be capable of being ruptured upon receiving a severe shock as from cone 28.

In the operation of this device, the apparatus is lowered into a borehole or a seismic shot hole substantially as shown in FIG. 1. The electrical detonator 21 is energized and the priming charge is ignited which in turn ignites the top explosive composition. A shock wave travels through the top explosive composition and strikes cone 28. Cone 28 concentrates the force at the small end of its cone thereby rupturing membrane 32. A shock wave from the high pressure gas in chamber 30 being released then rushes downwardly through chamber 34 which detonates the lower charge of the explosive composition 44. If the apparatus is designed such that the force of the shock wave is rather small then a priming charge 38 is needed to place between explosive composition 44 and chamber 34 so that the shock wave strikes the primer thus igniting it which in turn ignites the explosive composition 44. If on the other hand, the shock wave is rather high the primer 38 will not be needed as the shock wave is sufficient to detonate the lower explosive charge 44.

For the purpose of illustration herein, the velocity of transmission of energy in the earth surrounding the borehole is designated V. The transmission of the wave through the explosive composition 26 is designated $V_1$. The velocity of the shock wave front in chamber 34 is designated $V_2$. The vertical length of the explosive unit 26 is designated by $L_1$. The vertical length of the low pressure chamber is designated $L_2$. As is stated above, it is desired that the seismic wave velocity V in the earth should match the detonation of the various charges down the borehole. Then the following equation can be written:

(1)
$$\frac{L_1 + L_2}{V} = \frac{L_1}{V_1} + \frac{L_2}{V_2}$$

For a certain charge of length $L_1$ having a velocity $V_1$ and velocity V, one can solve for $V_2$ or $L_2$ as desired; if $V_2$ is known, one can solve for $L_2$ and arrive at the following equation:

(2)
$$L_2 = \frac{L_1 V_2 (V - V_1)}{V_1 (V_2 - V)}$$

As an example of the application of equation (2), a commonly used explosive composition 26 has a velocity of about 24,000 feet per second. For a typical earth section near the surface of the earth, V may be about 6,000 feet per second. $V_2$, the velocity with the shock tube, can be controlled as desired by design. However, it is assumed for this illustration it is 3,000 feet per second. Upon solving the equation (1) above, it is seen then that the ratio of the length of the delay unit $L_2$ to the length of the explosive unit $L_1$ is 3:4. If $L_1$ is twelve feet then $L_2$, the length of the delay unit, is nine feet.

The velocity $V_2$ of the delay unit can easily be varied from about 1,500 to 3,000 feet per second. When a shock wave is produced when a diaphragm ruptures under a compressed air load, the velocity of the wave produced is determined primarily by the volume and the pressure of the air or gas so released. For a discussion of the velocities of shock waves, attention is directed to an article entitled "The Disturbance Produced by Bursting Diaphragms with Compressed Air" by William Payman and Wilford Sheppard, beginning on page 293 of the Proceedings of the Royal Society, vol. 186, and published by the Royal Society, Burlington House, Piccadilly, London W., 1.

In determining the equation (1) above, it was assumed that the velocity of the energy through the cone transformer 28 was the same as that through the explosive composition 26; $L_1$ therefore included the length $L_4$ of the explosive composition and the length $L_3$ of the cone 28. $L_3$ is normally short compared to $L_1$. It is quite convenient to make the cone from material having approximately the same velocity as the explosive composition to simplify determinations of the length required in the delay unit. However, it is to be understood that a cone having a different velocity may be used and such difference taken into consideration in determining the length of the delay unit.

While there are above disclosed but one embodiment of the invention herein presented, it is possible to produce still other embodiments without departing from the inventive concept herein disclosed. It is desired, therefore, that only such limitations be imposed on the appended claims as there are stated therein or required by the prior art.

What is claimed is:

1. An apparatus for generating seismic waves and to be placed in the borehole in the surface of the earth which comprises in combination: an elongated tubular member; an explosive composition in the upper part of said tubular member; a cone transformer means spaced in said tubular member with the large end of said cone being abutted against and supporting said explosive composition; a membrane in contact with the small end of said cone means and sealingly engaging the inner walls of said tubular member; a gas under at least several atmospheric pressures within the chamber formed by said cone element, said membrane and said tubular member; a second explosive composition charge spaced in said tubular member and spaced from said membrane, a second chamber thus being formed within said tubular member between said second explosive composition and said membrane; and means to detonate said first explosive charge.

2. An apparatus as defined in claim 1 in which said second chamber between said membrane and said second explosive charge has been at least partially evacuated.

3. An apparatus as defined in claim 1 in which $$\frac{L_2}{L_1} = \frac{V_2 (V - V_1)}{V_1 (V_2 - V)}$$

in which $L_2$ is the length of said second chamber between said membrane and second explosive charge, $L_1$ is the length of the first explosive charge and said cone element, $V_1$ is the velocity of transmission of energy through said first charge and said cone, $V_2$ is the velocity of transmission of the shock wave through said second chamber between said membrane and said second explosive charge, V is the velocity of the transmission of energy in the earth surrounding said well bore.

4. An apparatus as defined in claim 1 which a priming composition has been placed in said tubular member adjacent said second explosive composition.

5. An apparatus as defined in claim 3 in which said membrane is made of copper.

6. An apparatus for placing in a borehole in the earth for generating seismic waves which comprises in combination: a housing member; a first compartment in said housing for containing an explosive composition; a second compartment in said housing and spaced from said first compartment for containing an explosive composition; a membrane in said housing member intermediate said first and said second compartments forming a third compartment and a fourth compartment, said third compartment containing a gas at a pressure substantially higher than the pressure in said fourth compartment; and means for rupturing said membrane upon detonation of an explosive composition in said first compartment.

7. A time delay unit for use between two explosive charges comprising in combination: a housing member; a cone transformer means having a large end and a small end, the large end of said cone transformer means sealing one end of said housing; a membrane in contact with the small end of said cone transformer means and sealingly engaging the inner surface of said housing, said membrane being spaced from the end of the housing opposite the large end of said cone transformer means; a gas under at least several atmospheric pressures in the chamber formed by said membrane, said inner surface of said housing, and said cone transformer means; sealing means enclosing the end of said housing opposite the large end of said cone transformer means, the chamber thus formed within said housing between said membrane and the closed end of said housing opposite the large end of said cone transformer means being at least partially evacuated.

References Cited in the file of this patent

UNITED STATES PATENTS

| | | |
|---|---|---|
| 120,963 | Gomez | Nov. 14, 1871 |
| 273,399 | Schneebeli | Mar. 6, 1883 |
| 2,736,263 | Lewis et al. | Feb. 28, 1956 |
| 2,770,312 | Silverman | Nov. 13, 1956 |
| 2,857,845 | Seavey | Oct. 28, 1958 |
| 2,889,773 | Staadt et al. | June 9, 1959 |